(12) United States Patent
Guelcher et al.

(10) Patent No.: US 8,318,820 B2
(45) Date of Patent: Nov. 27, 2012

(54) DEGRADABLE POLYURETHANE FOAMS

(75) Inventors: Scott A. Guelcher, Franklin, TN (US);
Vishal Patel, Cleveland, OH (US);
Jeffrey O. Hollinger, Gibsonia, PA
(US); Jonathan Didier, Pittsburgh, PA
(US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 11/667,090

(22) PCT Filed: Nov. 5, 2005

(86) PCT No.: PCT/US2005/039810
§ 371 (c)(1),
(2), (4) Date: May 4, 2007

(87) PCT Pub. No.: WO2006/055261
PCT Pub. Date: May 26, 2006

(65) Prior Publication Data
US 2007/0299151 A1    Dec. 27, 2007

Related U.S. Application Data

(60) Provisional application No. 60/625,380, filed on Nov. 5, 2004.

(51) Int. Cl.
*C08G 18/22* (2006.01)
*C08G 18/00* (2006.01)
*C08J 9/00* (2006.01)
(52) U.S. Cl. .................. 521/125; 521/155; 521/170
(58) Field of Classification Search .................. 521/170, 521/172, 155, 125
See application file for complete search history.

(56) References Cited

U.S. PATENT DOCUMENTS

| | | | |
|---|---|---|---|
| 5,503,844 A * | 4/1996 | Kwiatek et al. ............... | 424/449 |
| 5,575,871 A * | 11/1996 | Ryoshi et al. .................. | 156/78 |
| 5,578,662 A | 11/1996 | Bennett | |
| 5,665,831 A * | 9/1997 | Neuenschwander et al. . | 525/415 |
| 5,852,065 A * | 12/1998 | Frey et al. ..................... | 521/112 |
| 6,066,681 A | 5/2000 | Kaplan | |
| 6,194,475 B1 | 2/2001 | Boinowitz | |
| 6,207,767 B1 | 3/2001 | Bennett | |
| 6,284,811 B1 | 9/2001 | Sawai | |
| 6,306,177 B1 | 10/2001 | Felt | |
| 6,339,130 B1 | 1/2002 | Bennett | |
| 6,376,742 B1 | 4/2002 | Zdrahala | |
| 6,403,664 B1 | 6/2002 | Hoffmann | |
| 2004/0127563 A1 | 7/2004 | Deslauriers | |
| 2005/0013793 A1 | 1/2005 | Beckman | |

FOREIGN PATENT DOCUMENTS

| | | |
|---|---|---|
| EP | 1 162 222 | 12/2001 |
| WO | WO 2004/009227 | 1/2004 |
| WO | WO 2004/065450 | 5/2004 |
| WO | WO 2004/085508 | 10/2004 |
| WO | WO 2006/055261 | 5/2006 |

OTHER PUBLICATIONS

Clemitson, Castable Polyurethane Elastomers, Appendix 5, 2008.*
Bruin et al., Makromol Chem. Rapid Commun. 9, 589-594, 1988.*
Felber, G. et al.; Low—emission Amine Catalysts for Flexible Polyurethane Foams; 2003, pp. 1-14.
Ferrari, R.J. et al.; Coumpounding Polyurethanes; Industrial and Engineering Chemistry; vol. 50; No. 7; 1958; pp. 1041-1044.
Aylesworth, R. D. et al.; Polyesters of Dimer Acids as Intermediates for Urethane Foams; Modern Plastics; May 1958;pp. 145-154.
Saad, B. et al.; Degradable and Highly Porous Polyesterurethane foam as biomaterial: Effects and Phagocytosis of Degradation Products in Osteoblasts; Journal of Biomedical Materials Research; Vo. 39; No. 4; 1998; pp. 594-602.
Gorna, Katarzyna et al.; Preparation, Degradation and Calcification of Biodegradable Polyurethane Foams for Bone Graft Substitutes; Journal of Biomedical Materials Research; vol. 67; No. 3; 2003; pp. 813-827.
Gorna, Katarzyna et al.; Preparation, Degradation and Calcification of Biodegradable Polyurethane Foams for Bone Graft Substitutes; Abstract; Database Embase [Online]; Elservier Science Publishers; Amsterdam, NI; Dec. 1, 2003.
Saad, B. et al.; Degradable and Highly Porous Polyesterurethane foam as biomaterial: Effects and Phagocytosis of Degradation Products in Osteoblasts; Abstract; Database Compendex [Online], Engineering Information, Inc.; NY, NY; 1998.
Szycher, M, Szycher's Handbook of Polyurethanes, CRC Press, New York, New York, (1999).
Zhang J, Doll B, Beckman E, Hollinger Jo. A biodegradable polyurethane-ascorbic acid scaffold for bone tissue engineering. J. Biomed. Mater. Res. 2003;67A(2):389-400.
Zhang J, Doll B, Beckman J, Hollinger Jo. Three-dimensional biocompatible ascorbic acid-containing scaffold for bone tissue engineering. Tissue Engineering 2003:9(6):1143-1157.
Zhang J-Y, Beckman EJ, Hu J, Yuang G-G, Agarwal S, Hollinger JO. Synthesis, biodegradability, and biocompatibility of lysine diisocyanate-glucose polymers. Tissue Engineering 2002;8(5):771-785.
Zhang J-Y, Beckman EJ, Piesco NJ, Agarwal S. A new peptide-based urethane polymer: synthesis, biodegradation, and potential to support cell growth in vitro. Biomaterials 2000;21:1247-1258.

* cited by examiner

*Primary Examiner* — Liam Heincer
(74) *Attorney, Agent, or Firm* — Bartony & Associates, LLC (57) ABSTRACT

A method of synthesizing of a biocompatible and biodegradable polyurethane foam includes the steps of: mixing at least one biocompatible polyol, water, at least one stabilizer, and at least one cell opener, to form a resin mix; contacting the resin mix with at least one polyisocyanate to form a reactive liquid mixture; and reacting the reactive liquid mixture form a polyurethane foam. The polyurethane foam is preferably biodegradable within a living organism to biocompatible degradation products. At least one biologically active molecule having at least one active hydrogen can be added to form the resin mix.

45 Claims, 3 Drawing Sheets

DEGRADABLE POLYURETHANE FOAMS

CROSS-REFERENCE TO RELATED APPLICATIONS

This application is a 371 of PCT/US2005/039810, filed Nov. 5, 2005, which claims benefit of U.S. Provisional Patent Application Ser. No. 60/625,380, filed Nov. 5, 2004, the disclosures of which are incorporated herein by reference.

GOVERNMENT RIGHTS

This invention was made with government support under National Institutes of Health Grants No. T32EB00424 and R25 GM066943. The government has certain rights in this invention.

BACKGROUND OF THE INVENTION

The present invention relates to biocompatible and biodegradable polymers. Particularly, the invention relates to biocompatible and biodegradable polyurethane foams. In several embodiments, the present invention relates to injectable polyurethane foams, to methods and compositions for their preparation and to the use of such foams as scaffolds for bone tissue engineering.

Synthetic biodegradable polymers are promising materials for bone tissue engineering. Many materials, including allografts, autografts, ceramics, polymers, and composites thereof are currently used as implants to repair damaged bone. Because of the risks of disease transmission and immunological response, the use of allograft bone is limited. Although autograft bone has the best capacity to stimulate healing of bone defects, explantation both introduces additional surgery pain and also risks donor-site morbidity. Synthetic polymers are advantageous because they can be designed with properties targeted for a given clinical application. Polymer scaffolds must support bone cell attachment, proliferation, and differentiation. Tuning the degradation rate with the rate of bone remodeling is an important consideration when selecting a synthetic polymer. Another important factor is the toxicity of the polymer and its degradation products. Furthermore, the polymer scaffold must be dimensionally and mechanically stable for a sufficient period of time to allow tissue ingrowth and bone remodeling.

Two-component reactive liquid polyurethanes designed for tissue repair have been disclosed. For example, U.S. Pat. No. 6,306,177, the disclosure of which is incorporate herein by reference, discloses a method for repairing a tissue site comprising the steps of providing a curable polyurethane composition, mixing the parts of the composition, and curing the composition in the tissue site wherein the composition is sufficiently flowable to permit injection by minimally invasive techniques and exhibits a tensile strength between 6,000 and 10,000 psi when cured. However, because this injectable polyurethane is non-porous and hard, tissue ingrowth is likely to be limited.

U.S. Pat. No. 6,376,742, the disclosure of which is incorporated herein by reference, discloses a method for in vivo tissue engineering comprising the steps of combining a flowable polymerizable composition including a blowing agent and delivering the resultant composition to a wound site via a minimally invasive surgical technique. U.S. Pat. No. 6,376,742 also discloses methods to prepare microcellular polyurethane implants as well as implants seeded with cells.

Bennett and co-workers prepared porous polyurethane implants for bone tissue engineering from isocyanate-terminated prepolymers, water, and a tertiary amine catalyst (diethylethanolamine). See, for example, Bennett S, Connolly K, Lee D R, Jiang Y, Buck D, Hollinger J O, Gruskin E A. Initial biocompatibility studies of a novel degradable polymeric bone substitute that hardens in situ. Bone 1996; 19(1, Supplement):10S-107S; U.S. Pat. Nos. 5,578,662, 6,207,767 and 6,339,130, the disclosures of which are incorporated herein by reference. The prepolymers were synthesized from lysine methyl ester diisocyanate (LDI) and poly(dioxanone-co-glycolide) from a pentaerythritol initiator and then combined with either hydroxyapatite or tricalcium phosphate to form a putty. Water and a tertiary amine were added to the putty prior to implantation in rats. The putty did not elicit an adverse tissue response following implantation.

Zhang and co-workers prepared biodegradable polyurethane foams from LDI, glucose, and poly(ethylene glycol). Zhang J, Doll B, Beckman E, Hollinger J O. A biodegradable polyurethane-ascorbic acid scaffold for bone tissue engineering. J. Biomed. Mater. Res. 2003; 67A(2):389-400; Zhang J, Doll B, Beckman J, Hollinger J O. Three-dimensional biocompatible ascorbic acid-containing scaffold for bone tissue engineering. Tissue Engineering 2003; 9(6):1143-1157; Zhang J-Y, Beckman E J, Hu J, Yuang G-G, Agarwal S, Hollinger J O. Synthesis, biodegradability, and biocompatibility of lysine diisocyanate-glucose polymers. Tissue Engineering 2002; 8(5):771-785; and Zhang J-Y, Beckman E J, Piesco N J, Agarwal S. A new peptide-based urethane polymer: synthesis, biodegradation, and potential to support cell growth in vitro. Biomaterials 2000; 21:1247-1258., the disclosures of which are incorporated herein by reference. The foams were synthesized by reacting isocyanate-terminated prepolymers with water in the absence of catalysts. The polyurethane foams supported the attachment, proliferation, and differentiation of bone marrow stromal cells in vitro and were non-immunogenic in vivo. Bioactive foams were also prepared by adding ascorbic acid to the water prior to adding the prepolymer. As the polymer degraded, ascorbic acid was released to the matrix, resulting in enhanced expression of osteogenic markers such as alkaline phosphatase and Type I collagen.

Published PCT international patent application WO 2004/009227 A2, the disclosure of which is incorporated herein by reference, claims a star prepolymer composition suitable as an injectable biomaterial for tissue engineering. The prepolymer is the reaction product of a diisocyanate and a starter molecule having a molecular weight preferably less than 400 Da. Porous scaffolds were prepared by adding low levels (e.g., <0.5 parts per hundred parts polyol) of water.

Copending Published US Patent Application No. 2005/0013793 (U.S. patent application Ser. No. 10/759,904), the disclosure of which is incorporated herein by reference, discloses inter alia a biocompatible and biodegradable polyurethane composition including at least one biologically active component with an active hydrogen atom capable of reacting with isocyanates. As the polyurethane degrades in vivo, the bioactive component is released to the extracellular matrix where it is, for example, taken up by cells.

While materials such as those described above are useful for bone tissue engineering, it is desirable to improve certain properties associated with injectable polyurethane scaffolds. Highly porous (e.g., >80% or even >85%), fast-rising (e.g., <30 minutes) conventional polyurethane foams have been manufactured commercially for years. For example, Ferrari and co-workers' in Ferrari R J, Sinner J W, Bill J C, Brucksch W F. Compounding polyurethanes: Humid aging can be controlled by choosing the right intermediate. Ind. Eng. Chem. 1958; 50(7):1041-1044, and U.S. Pat. No. 6,066,681, the disclosures of which is incorporated herein by reference, disclose methods for preparation of polyurethane foams from diisocyanates and polyester polyols. Catalysts, including organometallic compounds and tertiary amines, are added to balance the gelling (reaction of isocyanate with polyol) and blowing (reaction of isocyanate with water) reactions. Stabilizer, such as polyethersiloxanes and sulfated castor oil, are added to both emulsify the raw materials and stabilize the rising bubbles. Cell openers, such as powdered divalent salts of stearic acid, cause a local disruption of the pore structure during the foaming process, thereby yielding foams with a natural sponge structure. See Oertel G. Polyurethane Handbook. Berlin: Hanser Gardner Publications; 1994; Szycher, M, Szycher's Handbook of Polyurethanes, CRC Press, New York, N.Y., (1999), the disclosures of which are incorporated herein by reference. However, conventional polyurethane foams are not suitable for tissue engineering applications because they are prepared from toxic raw materials, such as aromatic diisocyanates and organotin catalysts.

Although progress has been made in the development of biocompatible and biodegradable polymers, it remains desirable to develop biocompatible and biodegradable polymers, methods of synthesizing such polymers, implantable devices comprising such polymers and methods of using such polymers.

SUMMARY OF THE INVENTION

In one aspect, the present invention provides a method of synthesizing of a biocompatible and biodegradable polyurethane foam including the steps of: mixing at least one biocompatible polyol, water, at least one stabilizer, and at least one cell opener, to form a resin mix; contacting the resin mix with at least one polyisocyanate to form a reactive liquid mixture; and reacting the reactive liquid mixture form a polyurethane foam. The polyurethane foam is preferably biodegradable within a living organism to biocompatible degradation products. At least one biologically active molecule having at least one active hydrogen can be added to form the resin mix.

To promote transport of cells, fluids, and signaling molecules, the foams can have a porosity greater than 50 vol-%. The porosity $\epsilon$, or void fraction, is calculated from the density using the following equation:

$$\varepsilon = 1 - \left(\frac{\rho_B}{\rho_P}\right)\left(\frac{\rho_P - \rho_A \rho_P / \rho_B}{\rho_P - \rho_A}\right)$$

where $\rho_B$=bulk density of the polyurethane foam (kg m$^{-3}$), $\rho_P$=density of the polymer (kg m$^{-3}$), and $\rho_A$=density of air (kg m$^{-3}$). Porosities greater than 70 vol-% are preferred and porosities greater than 80 vol-% are even more preferred.

In several embodiments, at least one catalyst is added to form the resin mix. Preferably, the catalyst is non-toxic (in a concentration that may remain in the polymer). The catalyst can, for example, be present in the resin mix in a concentration in the range of approximately 0.5 to 5 parts per hundred parts polyol and, preferably in the range of approximately 1 to 5. The catalyst can, for example, be an organometallic compound or a tertiary amine compound. In several embodiments the catalyst includes stannous octoate, an organobismuth compound, triethylene diamine, bis(dimethylaminoethyl) ether, or dimethylethanolamine. An example of a preferred catalyst is triethylene diamine.

In several embodiments, the polyol is biocompatible and has a hydroxyl number in the range of approximately 50 to 1600. The polyol can, for example, be a biocompatible and polyether polyol or a biocompatible polyester polyol. In several embodiments, the polyol is a polyester polyol synthesized from at least one of $\epsilon$-caprolactone, glycolide, or DL-lactide.

Water can, for example, be present in the resin mix in a concentration in a range of approximately 0.1 to 4 parts per hundred parts polyol.

The stabilizer is preferably nontoxic (in a concentration remaining in the polyurethane foam) and can include nonionic surfactant or an anionic surfactant. The stabilizer can, for example, be a polyethersiloxane, a salt of a fatty sulfonic acid or a salt of a fatty acid. In the case that the stabilizer is a polyethersiloxane, the concentration of polyethersiloxane in the resin mix can, for example, be in the range of approximately 0.25 to 4 parts per hundred polyol. In the case that the stabilizer is a salt of a fatty sulfonic acid, the concentration of the salt of the fatty sulfonic acid in the resin mix is in the range of approximately 0.5 to 5 parts per hundred polyol. In the case that the stabilizer is a salt of a fatty acid, the concentration of the salt of the fatty acid in the resin mix is in the range of approximately 0.5 to 5 parts per hundred polyol. Polyethersiloxane stabilizer are preferably hydrolyzable. Examples of suitable stabilizers include a sulfated castor oil or sodium ricinoleicsulfonate.

The cell opener is preferably nontoxic (in a concentration remaining in the polyurethane) and comprises a divalent metal salt of a long-chain fatty acid having from about 1-22 carbon atoms. The cell opener can, for example, include a metal salt of stearic acid. The concentration of the cell opener in the resin mix is preferably in the range of approximately 0.5 to 7 parts per hundred polyol.

The polyisocyanate can, for example, be a biocompatible aliphatic polyisocyanate derived from a biocompatible polyamine compound (for example, amino acids). Examples of suitable aliphatic polyisocyanates include lysine methyl ester diisocyanate, lysine triisocyanate, 1,4-diisocyanatobutane, or hexamethylene diisocyanate.

The index of the foam, as defined by $$\text{INDEX} = 100 \times \frac{\text{number of } NCO \text{ equivalents}}{\text{number of } OH \text{ equivalents}}$$

is preferably in the range of approximately 80 to 140.

The polyurethane foams of the present invention are preferably synthesized without aromatic isocyanate compounds. The method of the present invention can also include the step of placing the reactive liquid mixture in a mold in which the reactive liquid mixture is reacted to form the polyurethane foam.

In another aspect, the present invention provides a biocompatible and biodegradable polyurethane synthesized via the steps of: mixing at least one polyol, water, at least one stabilizer, and at least one cell opener; contacting the resin mix with at least one polyisocyanate to form a reactive liquid mixture; and reacting the reactive liquid mixture to form a polyurethane foam. The polyurethane foam is preferably biodegradable within a living organism to biocompatible degradation products. At least one catalyst, as described above, can be added to form the resin mix. As also described above, at least one biologically active molecule having at least one active hydrogen can be added to form the resin mix.

In another aspect, the present invention provides method of synthesis of a biocompatible and biodegradable polyurethane foam including the steps of: reacting at least one polyol with at least one polyisocyanate to form an isocyanate-terminated prepolymer; mixing water, at least one stabilizer, at least one cell opener and at least one polyol to form a resin mix; contacting the resin mix with the prepolymer to form a reactive liquid mixture; and reacting the reactive liquid mixture to form a polyurethane foam. At least one catalyst, as described above, cans added to form the resin mix. As also described above, at least one biologically active molecule having at least one active hydrogen can be added to form the resin mix.

In a further aspect, the present invention provides a method of synthesizing a biocompatible and biodegradable polyurethane foam including the steps of: mixing at least one biocompatible polyol, water, at least one stabilizer, and at least one cell opener, to form a resin mix; contacting the resin mix with at least one aliphatic polyisocyanate to form a reactive liquid mixture; and reacting the reactive liquid mixture form a polyurethane foam.

In another aspect, the present invention provides a biocompatible and biodegradable polyurethane foam synthesized by: mixing at least one biocompatible polyol, water, at least one stabilizer, and at least one cell opener, to form a resin mix; contacting the resin mix with at least one aliphatic polyisocyanate to form a reactive liquid mixture; and reacting the reactive liquid mixture form a polyurethane foam.

In another aspect, the present invention provides a method of synthesizing of a biocompatible and biodegradable polyurethane foam including the step of reacting at least one biocompatible polyester polyol, water and at least one aliphatic polyisocyanate to form the polyurethane foam.

In a further aspect, the present invention provides a biocompatible and biodegradable polyurethane foam synthesized by reacting at least one biocompatible polyester polyol, water and at least one aliphatic polyisocyanate to form the polyurethane foam.

In still a further aspect, the present invention provides a method of synthesis of a biocompatible and biodegradable polyurethane foam including the steps of: reacting at least one polyol with at least one aliphatic polyisocyanate to form an isocyanate-terminated prepolymer; mixing water, at least one stabilizer, at least one cell opener and at least one polyol to form a resin mix; contacting the resin mix with the prepolymer to form a reactive liquid mixture; and reacting the reactive liquid mixture to form a polyurethane foam. Polyether and polyester polyols are useful for preparing prepolymers. Polyester polyols are preferred. Prepolymers having a percent free NCO content of 1 to 35% are useful. Prepolymers having a percent free NCO content of 5 to 30% are preferred.

Surprisingly, the present inventors have found that biocompatible and biodegradable polyurethane foams can be prepared from biocompatible and/or non-toxic components, such as aliphatic diisocyanates, resorbable polyester polyols, tertiary amine catalysts, and lipid-based stabilizers and cell openers. Despite the 7 to 10-fold lower reactivity of aliphatic diisocyanates (and other aliphatic polyisocyanates) relative to aromatic isocyanates, biocompatible and biodegradable polyurethane foams that are highly porous and fast-rising have been prepared. In general, the concentration of catalyst, cell opener and stabilizer used in synthesizing the polyurethane foams of the present invention are higher than corresponding concentration used in the synthesis of polyurethanes foams from aromatic isocyanates. The concentrations of catalyst and cell opener used in synthesizing the polyurethane foams of the present invention are preferably substantially higher than corresponding concentrations used in the synthesis of polyurethanes foams from aromatic isocyanates. Even using relatively high concentrations of catalyst and cell opener, it is surprising that high porosity, dimensionally stable polyurethane foams are formed from the aliphatic polyisocyanates of the present invention.

Preferably, no aromatic isocyanates (isocyanate derivatives of aromatic yamines) are used in forming the polyurethanes of the present invention. In that regard, it is believed that even small amounts of degradation products from aromatic isocyanates (including, for example, TDI and MDI) are so potently toxic they could be harmful even if only minimal hydrolysis occurred.

The invention can, for example, provide dimensionally stable, high porosity, injectable, biocompatible, biodegradable and (optionally) biologically active polyurethane foams. The open-pore content can be sufficiently high to prevent shrinkage of the foam. The foams of the present invention can, for example, support the attachment and proliferation of cells in vitro and are designed to degrade to and release biocompatible components in vivo. In that regard, the present invention also provides scaffolds for cell proliferation/growth comprising a polyurethane polymer as set forth above and/or fabricated using a synthetic method as described above.

Typically, the biodegradable compounds of the present invention degrade by hydrolysis. As used herein, the term "biocompatible" refers to compounds that do not produce a toxic, injurious, or immunological response to living tissue (or to compounds that produce only an insubstantial toxic, injurious, or immunological response). The term nontoxic as used herein generally refers to substances or concentrations of substances that do not cause, either acutely or chronically, substantial damage to living tissue, impairment of the central nervous system, severe illness, or death. Components can be incorporated in nontoxic concentrations innocuously and without harm. As used herein, the term "biodegradable" refers generally to the capability of being broken down in the normal functioning of living organisms/tissue (preferably, into innocuous, nontoxic or biocompatible products).

The polyurethanes compositions of the present invention are useful for a variety of applications, including, but not limited to, injectable scaffolds for bone tissue engineering and drug and gene delivery. The compositions of the present invention can, for example, be applied to a surface of a bone, deposited in a cavity or hole formed in a bone, injected into a bone or positioned between two pieces of bone. The compositions can be injected through the skin of a patient to, for example, fill a void, cavity or hole in a bone using, for example, a syringe. Likewise, the compositions of the present invention can be molded into any number of forms outside of the body and placed into the body. For example, the compositions of the present invention can be formed into a plate, a screw, a prosthetic element, a molded implant etc.

The invention encompasses methods and compositions for preparing biocompatible and biodegradable polyurethane foams that are dimensionally stable.

The present invention, along with the attributes and attendant advantages thereof, will best be appreciated and understood in view of the following detailed description taken in conjunction with the accompanying drawings.

DETAILED DESCRIPTION OF THE INVENTION

Figure 1:
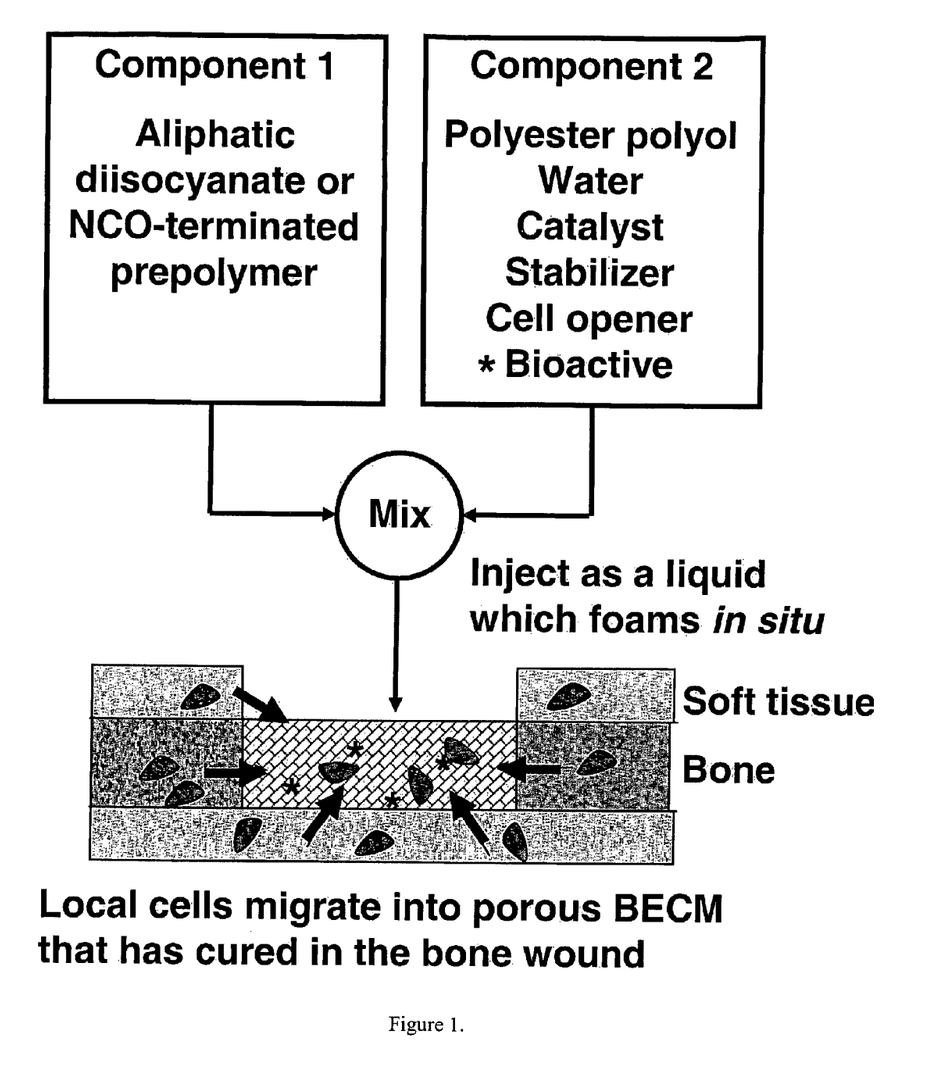
FIG. 1 illustrates the steps of one embodiment of a reactive liquid molding process of the present invention for preparing polyurethane foams.

One embodiment of a reactive liquid molding process of the present invention for preparing the polyurethane foam is shown in FIG. 1. In this embodiment, an aliphatic polyisocyanate (or an isocyanate-terminated prepolymer) component is contacted with the resin mix component (component 2 in FIG. 1) comprising at least one polyol, water, and at least one cell opener. Preferably at least one catalyst is also present in the resin mix component. In several embodiments, one or more bioactive components are present in the resin mix component. The resin mix of component 2 is mixed with the polyisocyanate or multi-functional isocyanate compounds (that, compounds have a plurality of isocyanate function groups) of component 1 to form a reactive liquid composition. The reactive liquid composition can, for example, be cast into a mold either inside or outside the body where it cures to form a porous polyurethane. Thus, as used herein the term "mold" refers generally to any cavity or volume in which the reactive liquid composition is placed, whether that cavity or volume is formed manually or naturally outside of a body or within a body.

The polyisocyanate reacts with compounds in the resin mix having an active hydrogen (e.g., polyol and water). Useful polyisocyanates include aliphatic polyisocyanates, such as lysine methyl ester diisocyanate (LDI), lysine triisocyanate (LTI), 1,4-diisocyanatobutane (BDI), and hexamethylene diisocyanate (HDI). LDI and LTI are examples of preferred polyisocyanates for use in the present invention. The index of a polyurethane foam is defined as:

$$\text{INDEX} = 100 \times \frac{\text{number of } NCO \text{ equivalents}}{\text{number of } OH \text{ equivalents}}$$

Preferably, the value of the index is in the range of approximately 80 to 140 and, more preferably, in the range of approximately 100 to 130.

Polyols react with polyisocyanates to form urethane linkages. This reaction, which results in high molecular weight polymer, is referred to as the gelling reaction. The polyol can, for example, be a polyether polyol, a polyester polyol, or a blend thereof. The hydroxyl number of a polyol is defined as:

$$OH \text{ Number} = 56.1 \times 1000 \times \frac{f}{M_n}$$

where f is the functionality of the polyol and $M_n$ is the number-average molecular weight. The hydroxyl number of the polyol/polyol blend is preferably in the range of approximately 50 to 1600. Polyester polyols are particularly suitable for use in the present invention because they hydrolyze in vivo to non-toxic, biocompatible degradation products. In several preferred embodiments of the present invention, the polyol is a polyester polyol or blend thereof having a hydroxyl number preferably in the range of approximately 80 to 420. Polyester polyols suitable for use in the present invention can, for example, be synthesized from at least one of the group of monomers including ϵ-caprolactone, glycolide, or DL-lactide.

Water reacts with polyisocyanate to form a disubstituted urea and carbon dioxide, which acts as a blowing agent. This reaction is referred to as the blowing reaction and results in a porous structure. The concentration of water in the resin mix affects the porosity and pore size distribution. To promote the presence of inter-connected pores, the concentration of water in the resin mix is preferably in the range of approximately 0.1 to 5 parts per hundred parts polyol (pphp) and, more preferably, in the range of approximately 0.5 to 3 pphp.

To form a dimensionally stable and highly porous foam, the rates of the gelling and blowing reactions are preferably balanced. This balance of rates can be accomplished through the use of catalysts, which can, for example, include an organometallic urethane catalyst, a tertiary amine urethane catalyst or a mixture thereof. In general, suitable catalysts for use in the present invention include compounds known in the art as effective urethane blowing and gelling catalysts, including, but not limited to, stannous octoate, organobismuth compounds (e.g., Coscat 83), triethylene diamine, bis(dimethylaminoethyl)ether, and dimethylethanolamine. Tertiary amine catalysts are preferred as a result of their generally lower toxicity relative to, for example, organometallic compounds. Triethylene diamine, which functions as both a blowing and gelling catalyst, is particularly preferred. Concentrations of catalyst blend in the resin mix are preferably in the range or approximately 0.1 to 5 pphp and, more preferably, in the range of approximately 0.5 to 5.0 pphp and, even more preferably, in the range of approximately 1 to 5 or in the range of approximately 1 to 4.

Foam stabilizers can be added to the resin mix of the present invention to, for example, disperse the raw materials, stabilize the rising carbon dioxide bubbles, and/or control the pore size of the foam. Although there has been a great deal of study of foam stabilizers (sometimes referred to herein as simply "stabilizers") the operation of stabilizers during foaming is not completely understood. Without limitation to any mechanism of operation, it is believed that stabilizers preserve the thermodynamically unstable state of a foam during the time of rising by surface forces until the foam is hardened. In that regard, foam stabilizers lower the surface tension of the mixture of raw materials and operate as emulsifiers for the system. Stabilizers, catalysts and other polyurethane reaction components are discussed, for example, in Oertel, Günter, ed., Polyurethane Handbook, Hanser Gardner Publications, Inc. Cincinnati, Ohio, 99-108 (1994). A specific effect of stabilizers is believed to be the formation of surfactant monolayers at the interface of higher viscosity of the bulk phase, thereby increasing the elasticity of the surface and stabilizing expanding foam bubbles.

Stabilizers suitable for use in the present invention include, but are not limited to, non-ionic surfactants (e.g., polyethersiloxanes) and anionic surfactants (e.g., sodium or ammonium salts of fatty sulfonic acids or fatty acids). Polyethersiloxanes, sulfated castor oil (Turkey red oil), and sodium ricinoleicsulfonate are examples of preferred stabilizers for use in the present invention. In the case of polyethersiloxane stabilizers, the concentrations of polyethersiloxane stabilizer in the resin mix is preferably in the range of approximately 0.25 to 4 pphp and, more preferably, in the range of approximately 0.5 to 3 pphp. Preferably, polyethersiloxane compounds for use in the present invention are hydrolyzable. In the case of stabilizers including salts of fatty sulfonic acid and/or salts of fatty acid, the concentration of salts of a fatty sulfonic acid and/or salts of a fatty acid in the resin mix is preferably in the range of approximately 0.5 to 5 pphp and, more preferably, in the range of approximately 1 to 3 pphp.

Cell openers or cell opening agents can be added to the resin mix to, for example, disrupt the pore structure during the foaming process, thereby creating foams with a natural sponge structure. Cell openers reduce the tightness and shrinkage of the foam, resulting in dimensionally stable foams with inter-connected pores. Cell openers and other reaction components of polyurethane foams are discussed, for example in Szycher, M, Szycher's Handbook of Polyurethanes, CRC Press, New York, N.Y., 9-6 to 9-8 (1999). Cell openers suitable for use in the present invention include powdered divalent metal salts of long-chain fatty acids having from about 1-22 carbon atoms. Divalent metal salts of stearic acid, such as calcium and magnesium stearate, are examples of preferred cell openers for use in the present invention. The concentrations of cell openers in the resin mix is preferably in the range of approximately 0.5-7.0 pphp and, more preferably, in the range of approximately 1 to 6 pphp.

Biologically active agents can optionally be added to the resin mix. As used herein, the term "bioactive" refers generally to an agent, a molecule, or a compound that affects biological or chemical events in a host. Bioactive agents may be synthetic molecules, biomolecules, or multimolecular entities and include, but are not limited to, enzymes, organic catalysts, ribozymes, organometallics, proteins, glycoproteins, peptides, polyamino acids, antibodies, nucleic acids, steroidal molecules, antibiotics, antivirals, antimycotics, anticancer agents, analgesic agents, antirejection agents, immunosuppressants, cytokines, carbohydrates, oleophobics, lipids, extracellular matrix and/or its individual components, demineralized bone matrix, pharmaceuticals, chemotherapeutics, and therapeutics. Cells and non-cellular biological entities, such as viruses, virenos, virus vectors, and prions can also be bioactive agents. Biologically active agents with at least one active hydrogen are preferred. Examples of chemical moieties with an active hydrogen are amine and hydroxyl groups. The active hydrogen reacts with free isocyanate in the reactive liquid mixture to form a covalent bond (e.g., urethane or urea linkage) between the bioactive molecule and the polyurethane. As the polyurethane degrades, the bioactive molecules are released and are free to elicit or modulate biological activity. The incorporation of biologically active components into biocompatible and biodegradable polyurethanes is discussed in some detail in US Patent Application No. 2005/0013793 (U.S. patent application Ser. No. 10/759,904).

After mixing the polyisocyanate and the resin mix, the resulting reactive liquid mixture is, for example, cast into a cavity or mold where the polyisocyanate reacts with the components of the resin mix having an active hydrogen to form a polyurethane foam. The reactive liquid mixture can be cast into a mold ex vivo and then implanted or can be cast directly onto a surface or into a cavity, volume or mold (for example, a wound) in the body.

Further details and representative examples of the present invention are described in the following examples.

EXAMPLES

Examples 1 to 6 and Comparative Example 7

Porous polyurethane scaffolds were prepared by mixing lysine methyl ester diisocyanate (LDI) with a resin mix comprising a polyester polyol blend, water, TEGOAMIN 33 (Goldschmidt, Hopewell, Va.) triethylene diamine catalyst, a stabilizer comprising either Turkey red oil (sulfated castor oil, Aldrich, St Louis, Mo.) or TEGOSTAB 8300 polyethersiloxane (Goldschmidt, Hopewell, Va.), and calcium stearate (Aldrich, St. Louis, Mo.).

Polyester polyol synthesis. A 900-Da polyester triol (P7C3G900, see Table 1) was synthesized from a glycerol starter and a 70/30 (w/w) mixture of ε-caprolactone/glycolide monomers using previously published techniques. See Sawhney A S, Hubbell J A. Rapidly degraded terpolymers of D,L-lactide, glycolide, and ε-caprolactone with increased hydrophilicity by copolymerization with polyethers. J. Biomed. Mater. Res. 1990; 24:1397-1411, the disclosure of which is incorporated herein by reference. Briefly, 5.12 g glycerol, 31.54 g ε-caprolactone, and 13.48 g glycolide were mixed in a 100-ml flask and heated under an argon atmosphere to 80° C. to yield a homogeneous mixture. 45 μl stannous octoate, the catalyst, were then added and the mixture was heated under mechanical stirring to 130° C. After a reaction time of 24 hours, the mixture was removed from the oil bath and poured into a sample bottle. Nuclear magnetic spectroscopy (NMR) was performed with a Bruker 300 MHz NMR using deuterated dichloromethane (DCM) as a solvent.

Polyurethane foam synthesis. Polyurethane foams were prepared by mixing the components in a Hauschild Speed-Mixer™ DAC 150 FVZ-K vortex mixer and casting into an open mold at atmospheric pressure. First the resin mix components comprising polyol(s), water, catalyst, stabilizer, and cell opener were mixed in a 10-g cup at 3500 rpm for 30 s. The appropriate amount of LDI was added and the two components mixed at 3500 rpm for 15 s. The mixture was then poured into the mold where it was allowed to rise. The time required for the mixture to cream (the time required for the mixture to form a viscous gel) was about 45 s after the cup was removed from the mixer. For the rise profile experiments, a 100-ml polyethylene beaker (Fisher Scientific) was used as the mold, while for the compression experiments, a 5.7 (L)× 4.3 (W)×4.3 (H) cm rectangular tray was used as the mold.

The foam formulation calculations were performed on a basis of 100 parts per hundred parts (pphp, by weight) of polyol. The index, which was targeted to be 120, is the ratio of NCO equivalents ($q_{NCO}$) to OH equivalents ($q_{OH}$):

$$\text{INDEX} = 100 \times \frac{\text{number of } NCO \text{ equivalents}}{\text{number of } OH \text{ equivalents}} = 100 \times \frac{q_{NCO}}{\sum_i q_{OH,i}} \quad (1)$$

The total mass $m_T$ of the foam was 3.0 g for the rise profile experiments and 4.3 g for the compression testing experiments. The number of hydroxyl equivalents $q_{OH,i}$ in component i (B-side) is given by:

$$q_{OH,i} = \frac{p_i}{w_i} \quad (2)$$

Where $w_i$ is the equivalent weight (g/eq) and $p_i$ is the pphp of component i. The number of NCO equivalents is given by:

$$q_{NCO} = \frac{\text{INDEX}}{100} \times \sum_i q_{OH,i} \quad (3)$$

The equivalent weight $w_{LDI}$ of LDI is:

$$w_{LDI} = \frac{42}{\% \text{ free } NCO} \quad (4)$$

where the percent free NCO was 39.2% (measured by the supplier). The pphp of LDI ($P_{LDI}$) were then calculated as $$p_{LDI} = w_{LDI} q_{NCO} \quad (5)$$

The mass of each component j in the foam formulation is given by:

$$m_j = m_T \frac{p_j}{\sum_j p_j} \quad (6)$$

The formulations for Examples 1 through 6 are listed in Table 1. The rise time is the time required for the foam to reach 90% of its final height. The shrinkage is the percent reduction in volume after 24 h. The compressive stress was measured by compressing the foam to 50% of its initial thickness and measuring the stress on the foam after 60 s.

The biocompatibility of the foams of Examples 1 through 6 and Comparative Example 7 was tested in a dynamic seeding environment with MG-63 cells. Live/Dead staining was utilized for qualitative evaluation of viability and CyQUANT was used to quantitate cell numbers. Foams 1 through 6 and Comparative Example 7 (MEDPOR®D, an implantable biocompatible porous polyethylene, available from Porex Surgical Inc., of Newnan, Ga., USA) control material were cut into approximate 2×5×8 mm pieces using Personna Super razor blades. 125 mL F12/MEM/10% FBS+PenStrep medium was added to each flask containing the assembled materials, and the flasks were then placed in the 37° C. incubator for approximately 1 hour to allow for foam expansion. MG-63 cells, P92, were then added to each flask at a concentration of $6.0 \times 10^6$ cells/flask in a total of 142 mL medium. On Days 1 and 4, 3 pieces of each material type were removed from the flasks and rinsed 2× with 1×PBS (Gibco). One piece of each material type was then cut in half using a razor blade—half was stained in Live/Dead stain for 30 minutes at 37° C., and the other half was used for CyQUANT. Remaining samples were washed once more with 1×PBS, transferred to a 48-well plate, and then frozen at −80° C. for CyQUANT. On the day of the CyQUANT assay, samples were thawed at room temperature for approximately 30 minutes and then incubated in CyQUANT solution for 10 minutes on the rocker bench. Samples were removed from the rocker bench, mashed 10-15 times with the blunt end of a p200 pipette tip, and then returned to the rocker bench for 5 minutes. After the assay, samples were rinsed several times with distilled water (Gibco) and allowed to dry before being weighed. All medium was removed from the remaining spinner flasks on Day 1, and samples intended for Day 4 analysis were rinsed with approximately 3-4 mL of pre-warmed 1×PBS (Gibco). 142 mL of fresh F12/MEM/10% FBS+PenStrep was then added to each flask.

Figure 2:
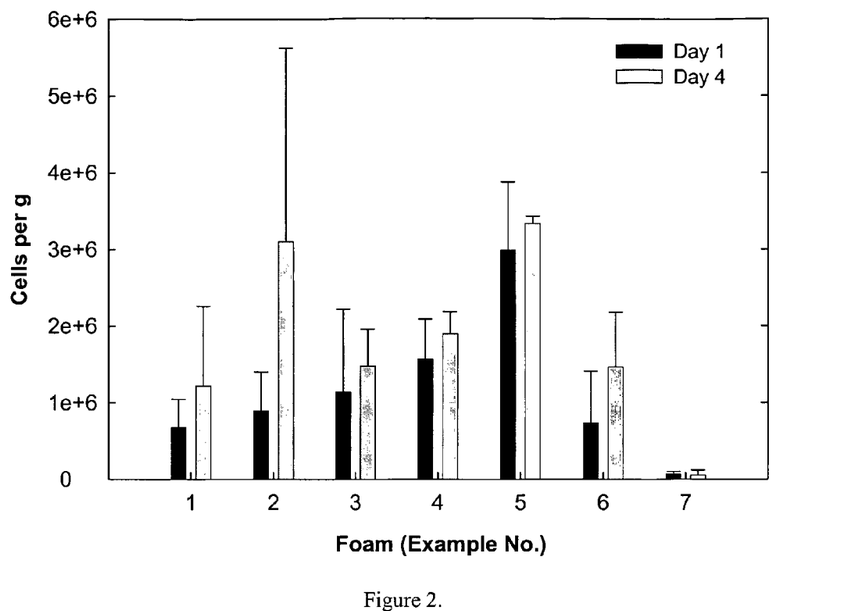
FIG. 2 illustrates the number of MG63 cells per gram as determined by CyQUANT assay at days 1 and 4 for each of six examples of a polyurethane foam of the present invention as well as for comparative or control example.
Figure 3:
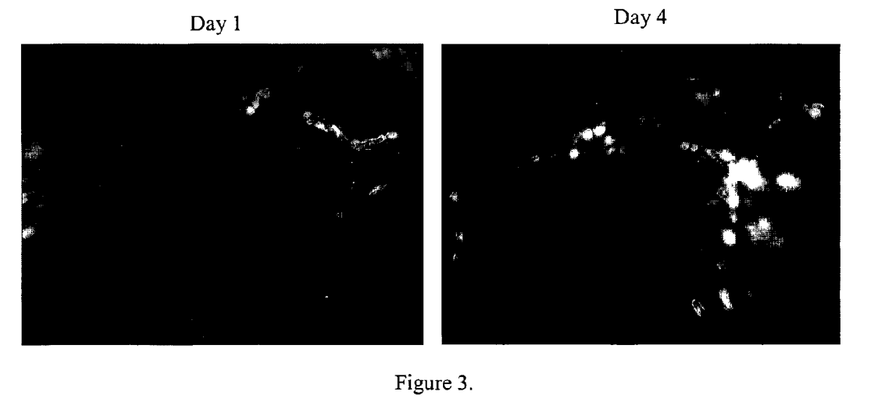
FIG. 3 illustrates live/dead images for MG63 cells attached to a polyurethane scaffolds made in accordance with Example 3 of the present invention as described in the Examples section hereof.

The results from the CyQuant assay are shown in FIG. 2 and live/dead images of the foam from Example 3 are shown in FIG. 3. The data suggest that MG-63 cells are able to attach and remain viable on all six foam types.

TABLE 1

| | Example, Parts per hundred parts polyol (pphp) | | | | | |
|---|---|---|---|---|---|---|
| | 1 | 2 | 3 | 4 | 5 | 6 |
| Component | | | | | | |
| P7C3G900 | 100.0 | 100.0 | 98.8 | 99.3 | 100.0 | 100.0 |
| CASPOL 5004 | — | — | 1.2 | 0.7 | — | — |
| Water | 3.0 | 2.5 | 3.1 | 3.1 | 2.9 | 3.0 |
| TEGOAMIN 33 | 2.9 | 3.1 | 3.1 | 3.0 | 2.9 | 2.9 |
| Turkey red oil | 2.5 | 2.5 | 2.5 | 2.4 | — | — |
| TEGOSTAB 8300 | — | — | — | — | 1.6 | 1.0 |
| Calcium stearate | 3.0 | 3.5 | 3.2 | 3.2 | 3.0 | 3.0 |
| INDEX | 119 | 122 | 120 | 119 | 121 | 121 |
| LDI | 84.7 | 79.5 | 86.7 | 86.8 | 85.5 | 86.4 |
| Property | | | | | | |
| Rise time (min) | 20 | 20 | 20 | 20 | 35 | 35 |
| Density (kg m$^{-3}$) | 43.5 | 52.1 | 60.2 | 45.3 | 49.3 | 49.9 |
| Porosity (vol-%) | 96.5 | 95.8 | 95.1 | 96.3 | 96.0 | 95.9 |
| Shrinkage (vol-%) | 5.4 | 6.4 | 27.2 | 2.7 | 2.9 | 1.0 |
| Compressive stress after 60 s (kPa) | N/A | 1.92 ± 0.27 | N/A | 1.27 ± 0.14 | 1.29 ± 0.13 | N/A |

Examples 8-13 and Comparative Example 14

Materials. Methyl 2,6-diisocyanatohexane (lysine methyl ester diisocyanate, LDI) was purchased from Kyowa Hakko USA (New York). Turkey red oil, calcium stearate, stannous octoate, glycerol, and ε-caprolactone were purchased from Aldrich (St. Louis, Mo.). Glycolide and DL-lactide were purchased from Polysciences (Warrington, Pa.). TEGOAMIN33 was received from Goldschmidt (Hopewell, Va.). Glycerol was dried at 10 mm Hg for 3 hours at 80° C. prior to use. 6-caprolactone was dried over anhydrous magnesium sulfate prior to use. All other materials were used as received. Two-component polyurethane foams were mixed using a Hauschild SpeedMixer™ DAC 150 FVZ-K (FlackTek Inc., Landrum, S.C.).

Polyester polyol synthesis. 900-Da polyester triols (P7C3G900, P6C3G1L900, and P7C2G1L900) were synthesized from a glycerol starter and the appropriate mixture (e.g., 70/30/0, 70/20/10, and 60/30/10 (w/w/w)) of ε-caprolactone/glycolide/DL-lactide monomers using previously published techniques as described above. Briefly, the appropriate amounts of dried glycerol, dried ε-caprolactone, glycolide, and stannous octoate (0.1 wt-%) were mixed in a 100-ml flask and heated under an argon atmosphere with mechanical stirring to 135° C. After a reaction time of 24 hours, the mixture was removed from the oil bath. Nuclear magnetic resonance spectroscopy (NMR) was performed with a Bruker 300 MHz NMR to verify the structure of the polyester triols using deuterated dichloromethane (DCM) as a solvent. Dynamic viscosity was measured using a Brookfield TC500 viscometer (spindle #51).

Polyurethane foam synthesis. Two-component polyurethane foams were prepared from LDI and the polyester polyols described previously. The resin mix was prepared by mixing the polyester polyol, water, TEGOAMIN33 (catalyst), Turkey red oil (stabilizer), and calcium stearate (pore opener) in a 10-ml cup at 3300 rpm for 30 s in a Hauschild SpeedMixer™ DAC 150 FVZ-K vortex mixer. The LDI was then added and mixed with the resin mix at 3300 rpm for 15 s. The resulting reactive liquid mixture was then cast into a 120-ml paper cup and cured in a shaker bath maintained at 37° C. for 18 h. The index (targeted value=115) is the ratio of isocyanate (NCO) equivalents ($q_{NCO}$) to hydroxyl (OH) equivalents ($q_{OH}$):

$$\text{INDEX} = 100 \times \frac{\text{number of } NCO \text{ equivalents}}{\text{number of } OH \text{ equivalents}} = 100 \times \frac{q_{NCO}}{\sum_i q_{OH,i}} \quad (1)$$

Six polyurethane foam formulations are listed in Table 2. Weight loss at 4 weeks was determined by incubating the materials in phosphate-buffered saline (PBS) at 37° C. for 4 weeks, at which time the materials were removed from the PBS, dried under vacuum at 37° C. for 48 hours, and weighed.

All aspects of cell culture system assays were carried out using standard aseptic tissue culture techniques as described in Section [0039] above.

Figure 4:
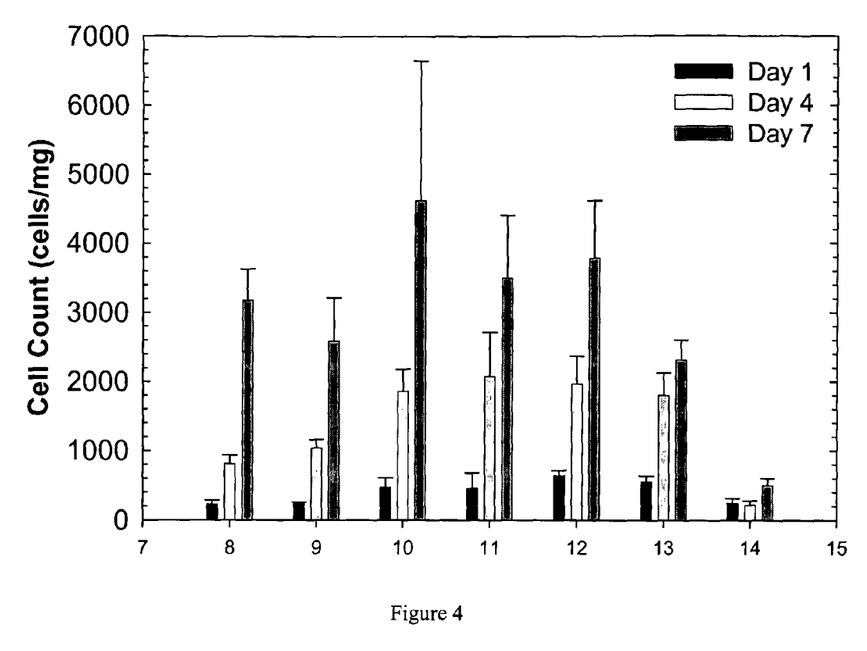
FIG. 4 illustrates the number of MG63 cells per gram as determined by CyQUANT assay at days 1, 4, and 7 for each of six examples of a polyurethane foam of the present invention as well as for comparative or control example.

Cell proliferation was determined with the CyQUANT® Cell Proliferation Assay Kit according to the manufacturer's instructions using triplicate samples on day 1 and day 4 of culture. Fluorescence was measured with a Perkin Elmer HTS 7000 BioAssay Reader and HT Soft V. 2.00 software (excitation 492 nm and emission 535 nm). After the assay, samples were rinsed with distilled water, dried and weighed. The results of the CyQuant assay are set forth in FIG. 4 for foams 7 through 13 of the present invention and for comparative example 7 (MEDPOR®).

The Live/Dead Viability/Cytotoxicity Kit was used to determine cell viability of attached cells on days one and four of culture. Three random areas from one piece of each foam and control material were assessed for cell viability by calculating the percentage of live cells relative to total cells. Fluorescent images to document cell viability used a Nikon Microphot-SA microscope equipped with a Kodak DC290 digital camera. Viability on Day 7 for all six materials and the control was greater than 97%.

TABLE 2

Two-component polyurethane foam formulations. Pphp denotes parts per hundred parts polyol, TA33 denotes TEGOAMIN33, SCO denotes sulfacted castor oil, and CS denotes calcium stearate. Foam P7C2G1LW200 contains 2.0 pphp Coscat 83.

| Ex | Polymer | Polyol | LDI Pphp | Water Pphp | TA33 Pphp | SCO Pphp | CS pphp |
|----|---------|--------|----------|------------|-----------|----------|---------|
| 8  | P7C3GW275    | P7C3G    | 79.1 | 2.75 | 3.0 | 1.5 | 4.0 |
| 9  | P7C3GW200    | P7C3G    | 68.8 | 2.00 | 3.0 | 1.5 | 4.0 |
| 10 | P7C3GW125    | P7C3G    | 58.6 | 1.25 | 3.0 | 1.5 | 4.0 |
| 11 | P7C3GW050    | P7C3G    | 48.3 | 0.5  | 3.0 | 1.5 | 4.0 |
| 12 | P6C3G1LW200  | P6C3G1L  | 68.8 | 2.00 | 3.0 | 1.5 | 4.0 |
| 13 | P7C2G1LW200  | P7C2G1L  | 68.8 | 2.00 | 1.0 | 1.5 | 4.0 |

TABLE 3

Polyurethane foam density and thermal degradation.

| Ex | Polymer | Density kg m$^{-3}$ | Porosity vol-% | Wt loss at 8 wks, wt-% |
|----|---------|---------------------|----------------|------------------------|
| 8  | P7C3GW275   | 51.5 ± 0.5  | 95.8 | 7.0 ± 0.3 |
| 9  | P7C3GW200   | 73.4 ± 1.2  | 94.0 | 6.0 ± 1.2 |
| 10 | P7C3GW125   | 81.2 ± 1.2  | 93.3 | 7.8 ± 0.7 |
| 11 | P7C3GW050   | 132.5 ± 5.8 | 89.1 | 7.2 ± 1.0 |
| 12 | P6C3G1LW200 | 76.7 ± 12.8 | 93.7 | 9.8 ± 0.9 |
| 13 | P7C2G1LW200 | 60.6 ± 3.2  | 95.1 | 2.3 ± 0.6 |

Examples 15-16

Materials. Lysine triisocyanate (LTI) was purchased from Kyowa Hakko USA (New York). Turkey red oil, calcium stearate, stannous octoate, glycerol, and ε-caprolactone were purchased from Aldrich (St. Louis, Mo.). Glycolide was purchased from Polysciences (Warrington, Pa.). TEGOAMIN33 was received from Goldschmidt (Hopewell, Va.). Glycerol was dried at 10 mm Hg for 3 hours at 80° C. prior to use. ε-caprolactone was dried over anhydrous magnesium sulfate prior to use. All other materials were used as received. Two-component polyurethane foams were mixed using a Hauschild SpeedMixer™ DAC 150 FVZ-K (FlackTek Inc., Landrum, S.C.).

Polyester polyol synthesis. Polyester triols (P7C3G900 and P7C3G1800) were synthesized from a glycerol starter and a 70/30 mixture (w/w) of ε-caprolactone/glycolide monomers using previously published techniques as described above. Briefly, the appropriate amounts of dried glycerol, dried ε-caprolactone, glycolide, and stannous octoate (0.1 wt-%) were mixed in a 100-ml flask and heated under an argon atmosphere with mechanical stirring to 135° C. After a reaction time of 24 hours, the mixture was removed from the oil bath. Nuclear magnetic resonance spectroscopy (NMR) was performed with a Bruker 300 MHz NMR to verify the structure of the polyester triols using deuterated dichloromethane (DCM) as a solvent.

Polyurethane foam synthesis. Two-component polyurethane foams were prepared from LTI and the polyester polyols described previously. The resin mix was prepared by mixing the polyester polyol, water, TEGOAMIN33 (catalyst), Turkey red oil (stabilizer), and calcium stearate (pore opener) in a 10-ml cup at 3300 rpm for 30 s in a Hauschild SpeedMixer™ DAC 150 FVZ-K vortex mixer. The LTI was then added and mixed with the resin mix at 3300 rpm for 15 s. The resulting reactive liquid mixture was then cast into a 120-ml paper cup and cured in a shaker bath maintained at 37°

C. for 18 h. The index (targeted value=115) is the ratio of isocyanate (NCO) equivalents ($q_{NCO}$) to hydroxyl (OH) equivalents ($q_{OH}$):

$$\text{INDEX} = 100 \times \frac{\text{number of NCO equivalents}}{\text{number of OH equivalents}} = 100 \times \frac{q_{NCO}}{\sum_i q_{OH,i}} \quad (1)$$

Two polyurethane foam formulations are set forth in Table 4.

TABLE 4

Two-component polyurethane foam formulations prepared from lysine triisocyanate.

| Ex | Polyol | LTI Pphp | Water Pphp | TA33 Pphp | SCO Pphp | CS pphp | Porosity vol-% |
|----|--------|----------|------------|-----------|----------|---------|----------------|
| 14 | P7C3G900 | 51.7 | 1.5 | 1.5 | 1.6 | 4.0 | 93.1 |
| 15 | P7C3G1800 | 34.5 | 1.5 | 1.5 | 1.6 | 4.0 | 93.5 |

The foregoing description and accompanying drawings set forth the preferred embodiments of the invention at the present time. Various modifications, additions and alternative designs will, of course, become apparent to those skilled in the art in light of the foregoing teachings without departing from the scope of the invention. The scope of the invention is indicated by the following claims rather than by the foregoing description. All changes and variations that fall within the meaning and range of equivalency of the claims are to be embraced within their scope.

What is claimed is:

1. A polyurethane foam synthesized via:
   mixing at least one polyol, water, at least one stabilizer, at least one catalyst, and at least one cell opener wherein the concentration of cell opener is at least 2 part per hundred polyol and the cell opener comprises a divalent metal salt of a long-chain fatty acid having from about 1 to 22 carbon atoms and wherein the concentration of catalyst in the resin is in the range of approximately 1 to 5 parts per hundred polyol;
   contacting the resin mix with at least one aliphatic polyisocyanate in the absence of aromatic isocyanates to form a reactive liquid mixture; and
   reacting the reactive liquid mixture to form a polyurethane foam,
   the polyurethane foam being biodegradable within a living organism.

2. The polyurethane of claim 1 wherein the concentration of the cell opener is at least 3 part per hundred polyol.

3. The polyurethane of claim 2 wherein the catalyst is nontoxic.

4. The polyurethane of claim 1 wherein the reactive liquid mixture is formed in vivo.

5. The polyurethane of claim 2 wherein the catalyst comprises an organometallic compound or a tertiary amine compound.

6. The polyurethane of claim 5 wherein the catalyst comprises stannous octoate, an organobismuth compound, triethylene diamine, bis(dimethylaminoethyl)ether, or dimethylethanolamine.

7. The polyurethane of claim 5 wherein the catalyst comprises triethylene diamine.

8. The polyurethane of claim 1 wherein at least one biologically active molecule having at least one active hydrogen is added to form the resin mix.

9. A method of synthesis a biocompatible and biodegradable polyurethane foam comprising the steps of:
   reacting at least one polyol with at least one aliphatic polyisocyanate in the absence of aromatic isocyanates to form an isocyanate-terminated prepolymer;
   mixing water, at least one stabilizer, at least one catalyst, at least one cell opener and at least one polyol to form a resin mix, wherein the concentration of cell opener is at least 2 part per hundred polyol and the cell opener comprises a divalent metal salt of a long-chain fatty acid having from about 1 to 22 carbon atoms and the concentration of catalyst is in the range of 1 to 5 parts per hundred polyol, and;
   contacting the resin mix with the prepolymer to form a reactive liquid mixture; and
   reacting the reactive liquid mixture to form a polyurethane foam.

10. The method of claim 9 wherein at least one catalyst is added to form the resin mix and the concentration of the cell opener is at least 3 part per hundred polyol.

11. The method of claim 10 wherein the catalyst is nontoxic.

12. The method of claim 10 wherein the reactive liquid mixture is formed in vivo.

13. The method of claim 10 wherein the catalyst comprises an organometallic compound or a tertiary amine compound.

14. The method of claim 10 wherein the catalyst comprises stannous octoate, an organobismuth compound, triethylene diamine, bis(dimethylaminoethyl)ether, or dimethylethanolamine.

15. The method of claim 10 wherein the catalyst comprises triethylene diamine.

16. The method of claim 10 wherein at least one biologically active molecule having at least one active hydrogen is added to form the resin mix.

17. A method of synthesis of a biocompatible and biodegradable polyurethane foam comprising:
   reacting at least one polyester polyol with at least one aliphatic polyisocyanate in the absence of aromatic isocyanates to form an isocyanate-terminated prepolymer;
   mixing water, at least one stabilizer, at least one catalyst, at least one cell opener and at least one polyol to form a resin mix, wherein the concentration of cell opener is at least 2 part per hundred polyol and the cell opener comprises a divalent metal salt of a long-chain fatty acid having from about 1 to 22 carbon atoms and the concentration of catalyst is in the range of 1 to 5 parts per hundred polyol;
   contacting the resin mix with the prepolymer to form a reactive liquid mixture; and
   reacting the reactive liquid mixture to form a polyurethane foam.

18. A method of forming a polyurethane foam comprising:
   mixing at least one polyol, water, at least one stabilizer, at least one catalyst, and at least one cell opener, to form a resin mix, wherein the concentration of cell opener is at least 2 part per hundred polyol and the cell opener comprises a divalent metal salt of a long-chain fatty acid having from about 1 to 22 carbon atoms and wherein the concentration of catalyst in the resin is in the range of approximately 1 to 5 parts per hundred polyol;
   contacting the resin mix with at least one aliphatic polyisocyanate in the absence of aromatic isocyantes to form a reactive liquid mixture; and
   reacting the reactive liquid mixture to form the polyurethane foam;

the polyurethane foam being biodegradable within a living organism.

19. The method of claim 18 wherein the concentration of the cell opener is at least 3 part per hundred polyol.

20. The method of claim 19 wherein the catalyst is non-toxic.

21. The method of claim 19 wherein the reactive liquid mixture is formed in vivo via injection.

22. The method of claim 19 wherein the catalyst comprises an organometallic compound or a tertiary amine compound.

23. The method of claim 22 wherein the catalyst comprises stannous octoate, an organobismuth compound, triethylene diamine, bis(dimethylaminoethyl)ether, or dimethylethanolamine.

24. The method of claim 22 wherein the catalyst comprises triethylene diamine.

25. The method of claim 19 wherein at least one biologically active molecule having at least one active hydrogen is added to form the resin mix.

26. The method of claim 19 wherein the polyol is biocompatible and has a hydroxyl number in the range of approximately 50 to 1600.

27. The method of claim 19 wherein the polyol is biocompatible and comprises a polyether polyol or a polyester polyol.

28. The method of claim 27 wherein the polyol is a polyester polyol synthesized from at least one of ε-caprolactone, glycolide, or DL-lactide.

29. The method of claim 19 wherein water is present in the resin mix in a concentration in a range of approximately 0.1 to 4 parts per hundred parts polyol.

30. The method of claim 19 wherein the stabilizer comprises a non-ionic surfactant or an anionic surfactant.

31. The method of claim 30 wherein the stabilizer comprises a polyethersiloxane, a salt of a fatty sulfonic acid or a salt of a fatty acid.

32. The method of claim 30 wherein the stabilizer comprises polyethersiloxane and the concentration of polyethersiloxane in the resin mix is in the range of approximately 0.25 to 4 parts per hundred polyol, the stabilizer comprises a salt of a fatty sulfonic acid and the concentration of salt of the fatty sulfonic acid in the resin mix is in the range of approximately 0.5 to 5 parts per hundred polyol, or the stabilizer comprises a salt of a fatty acid and the concentration of salt of the fatty acid in the resin mix is in the range of approximately 0.5 to 5 parts per hundred polyol.

33. The method of claim 32 wherein the polyethersiloxane is hydrolyzable.

34. The method of claim 30 wherein the stabilizer comprises a sulfated castor oil or sodium ricinoleicsulfonate.

35. The method of claim 18 wherein the cell opener comprises a metal salt of stearic acid.

36. The method of claim 19 wherein the concentration of the cell opener in the resin mix at a concentration in the range of approximately 3 to 7 part per hundred polyol.

37. The method of claim 19 wherein the polyisocyanate is a biocompatible aliphatic polyisocyanate derived from a biocompatible polyamine compound.

38. The method of claim 37 wherein the polyisocyanate is lysine methyl ester diisocyanate, 1,4-diisocyanatobutane, or hexamethylene diisocyanate.

39. The method of claim 37 wherein the polyisocyanate is lysine methyl ester diisocyanate.

40. The method of claim 18 wherein the reactive liquid mixture is formed in vivo.

41. The method of claim 18 wherein the index of the foam is defined as $$\text{INDEX} = 100 \times \frac{\text{number of NCO equivalents}}{\text{number of OH equivalents}}$$

and is in the range of approximately 80 to 140.

42. The method of claim 18 further comprising the step of placing the reactive liquid mixture in a mold in which the reactive liquid mixture is reacted to form the polyurethane foam.

43. The method of claim 18 wherein the resin mix further comprises demineralized bone matrix.

44. The method of claim 18 wherein the resin mix further comprises extracellular matrix or a component of extracellular matrix.

45. The method of claim 18 wherein the polyurethane foam has a porosity greater than 80%.

* * * * *